United States Patent
Land

[15] 3,683,771
[45] Aug. 15, 1972

[54] SELF-DEVELOPING CAMERA
[72] Inventor: Edwin H. Land, Cambridge, Mass.
[73] Assignee: Polaroid Corporation, Cambridge, Mass.
[22] Filed: Aug. 19, 1970
[21] Appl. No.: 65,053

[52] U.S. Cl. .................................. 95/13, 95/89 R
[51] Int. Cl. ............................................. G03b 17/50
[58] Field of Search .......................... 95/13, 14, 89

[56] References Cited

UNITED STATES PATENTS

| 3,545,357 | 12/1970 | Erlichman | 95/13 |
| 3,416,863 | 12/1968 | Ralston | 355/110 |
| 3,537,370 | 11/1970 | Wareham | 95/13 |
| 3,447,437 | 6/1969 | Tiffany | 95/13 |

Primary Examiner—Samuel S. Matthews
Assistant Examiner—Richard M. Sheer
Attorney—Brown and Mikulka and Robert E. Corb

[57] ABSTRACT

A self-developing camera for use with a film pack including a plurality of film units arranged in stacked relation in a container. The camera comprises a film holder for holding the pack with the forwardmost film unit located in position for exposure, a pair of driven processing rollers for advancing an exposed film unit from the camera while distributing a processing liquid within the camera and a film feeder for advancing an exposed film unit from exposure position within the container into the bite of the processing rollers. The camera includes controls for arresting the rotation of the processing rollers with the trailing end of a film unit engaged therebetween so as to retain the trailing end of the extended film unit within the camera and provide the operator with an opportunity to grasp and remove the film completely from the camera. In a preferred embodiment of the camera, the controls also reverse the direction of rotation of the rollers to return the film unit to a storage position within the camera behind the film pack and a door permitting the film unit to be withdrawn. The film holder is moved forwardly out of the path of return movement of the film unit and then rearwardly to return the film pack to exposure position.

22 Claims, 7 Drawing Figures

INVENTOR.
EDWIN H. LAND
BY Brown and Mikulka
and
Robert E. Corb
ATTORNEYS

INVENTOR.
EDWIN H. LAND
BY Brown and Mikulka
and
Robert E. Corb
ATTORNEYS

INVENTOR.
EDWIN H. LAND

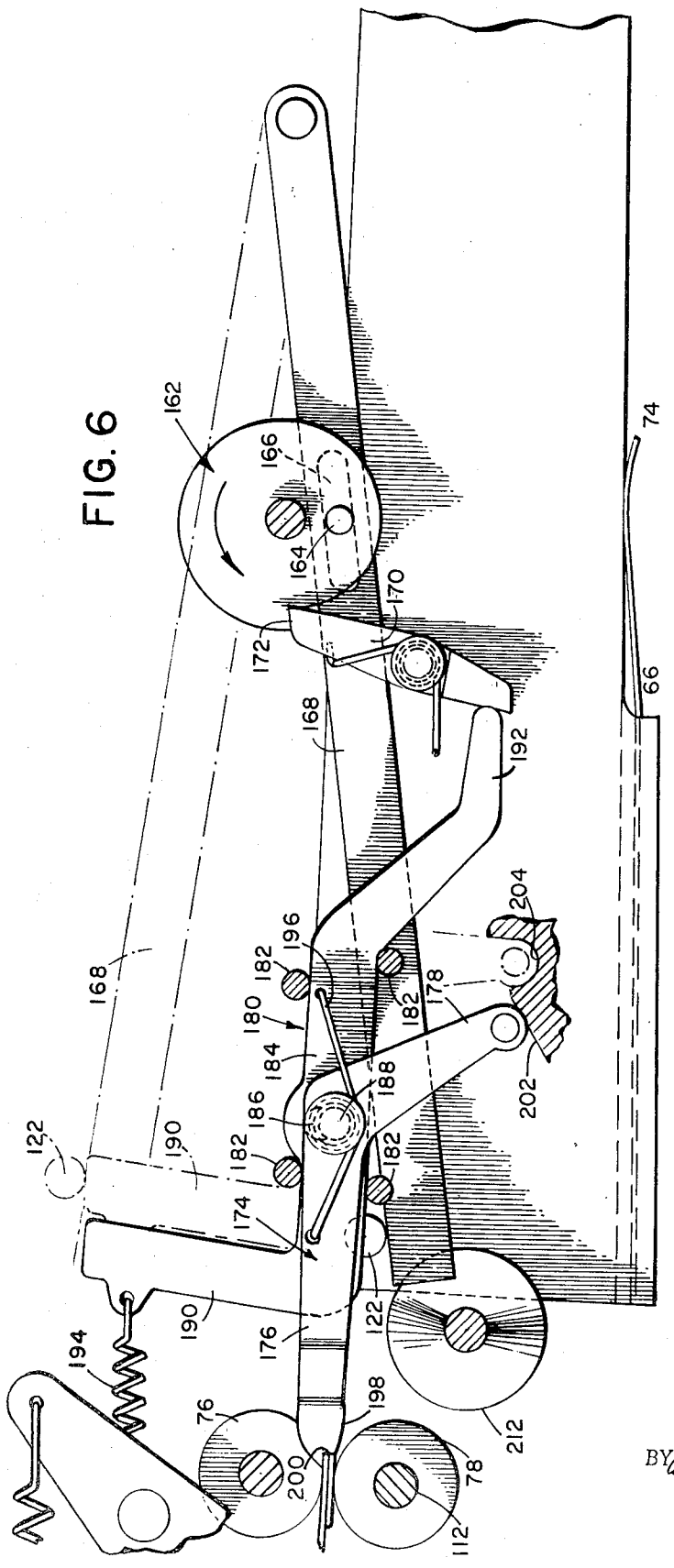
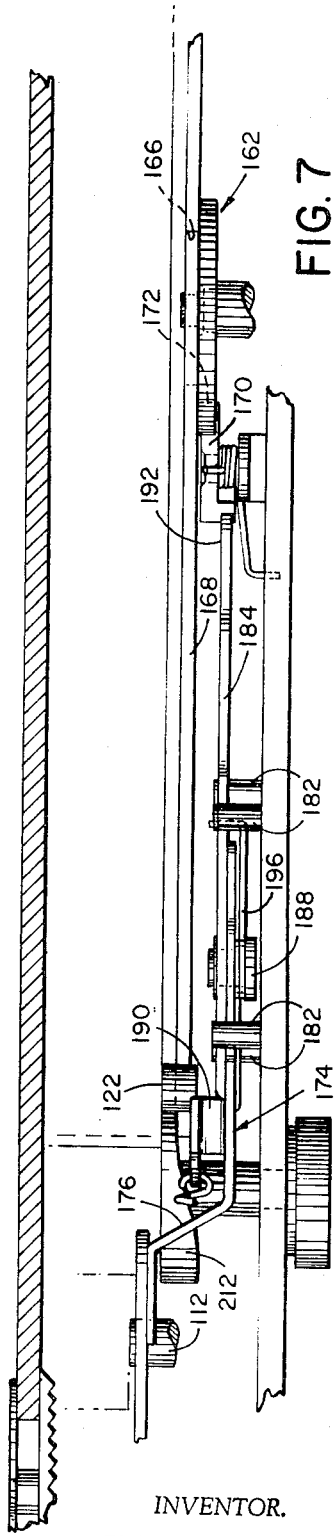
FIG. 6
FIG. 7
INVENTOR.
EDWIN H. LAND
BY Brown and Mikulka
and
Robert E. Corb
ATTORNEYS

SELF-DEVELOPING CAMERA

The present invention is concerned with a self-developing camera of the type disclosed, for example, in U.S. Pat. No. 3,447,437, dated June 3, 1969, and in the copending U.S. application of Edwin H. Land et al Ser. No. 29,753, filed Apr. 22, 1970, as a continuation of application Ser. No. 655,850 filed July 25, 1967. Cameras of this type are adapted for use with a film pack comprising a plurality of self-developing film units arranged in stacked relation in a container and generally include film holding means for positioning the film pack within the camera with the forwardmost film unit located in exposure position; a pair of juxtaposed processing rollers and drive means for rotating the rollers to advance a film unit therebetween directly from the camera while distributing a processing liquid within the film unit; and means for feeding an exposed film unit from exposure position within the pack into the bite of the processing rollers. Such cameras are preferably automatic, their operation requiring only that the operator press a button to initiate an exposure and processing cycle during which a film unit is exposed, processed and ejected from the camera and the exposure system of the camera is placed in readiness for a subsequent exposure.

Film units adapted for use with cameras of the type described generally comprise a photosensitive element including a layer of photosensitive material adapted to be exposed to produce an image, a second element preferably including an image-receptive layer superposed with a photosensitive element and a container of processing liquid preferably adapted, when distributed between the superposed elements, to form a visible transfer image in an image-receptive layer sandwiched between the elements. In the preferred form of film unit, the second or the image-receptive element is transparent, the photosensitive element is opaque and the photosensitive layer is exposed through the second element. The processing liquid includes agents for preventing image-forming exposure of the photosensitive element almost immediately as the liquid is distributed between the two elements, by forming a light opaque layer between the second element and the photosensitive layer and/or desensitizing the photosensitive layer, This makes it possible to advance the unit between the processing rollers directly from the camera into the light thereby substantially reducing the size and complexity of the camera by virtue of the elimination of means for enclosing the film in a light-free environment during liquid spreading and image formation.

In addition to the aforementioned advantages, advancement of the film unit between the processing rollers directly from the camera into the light poses the problem of what to do with the film unit that is advanced from the camera. The entire exposure and processing cycle may take only a fraction of a second and this, coupled with the fact that the camera may be substantially automatic in its operation, enables the operator to make a number of exposures in rapid succession. This problem of how to handle each film unit as it emerges from the camera is further complicated by the fact that in the preferred form of camera shown and described herein and in the aforementioned patent and application, the film unit emerges from the side of the camera facing the subject closely adjacent the lends and at an acute angle with respect to the lens axis so as to partially block the cone of light entering the lens.

An object of the invention is to provide a novel and improved self-developing camera of the type described including a pair of processing rollers for distributing a processing liquid within a film unit while advancing the film unit between the rollers and directly from the camera, and adapted to retain the trailing end of the film unit within the camera by automatically arresting the rotation of the rollers with the trailing end of the film unit engaged therebetween.

Other objects of the invention are: to provide a camera of the type described including means for reversing the direction of rotation of the processing rollers when a film unit has passed almost completely between the rollers and from the camera and retracting the film unit into the camera into a storage position therein; to provide a camera of the type described including means for retracting a film unit, a film holder for supporting a film unit in position for exposure and means for moving the film holder out of the path of return movement of the film unit; and to provide a camera as described that is fully automatic in its operation requiring only that operator initiate each exposure and processing cycle thereby making possible the exposure and processing of a number of film units in rapid succession.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 6 is an elevational view, similar to FIGS. 3 and 4, illustrating another embodiment of the camera; and FIG. 7 is a plan view showing the components of FIG. 6.

Figure 1:
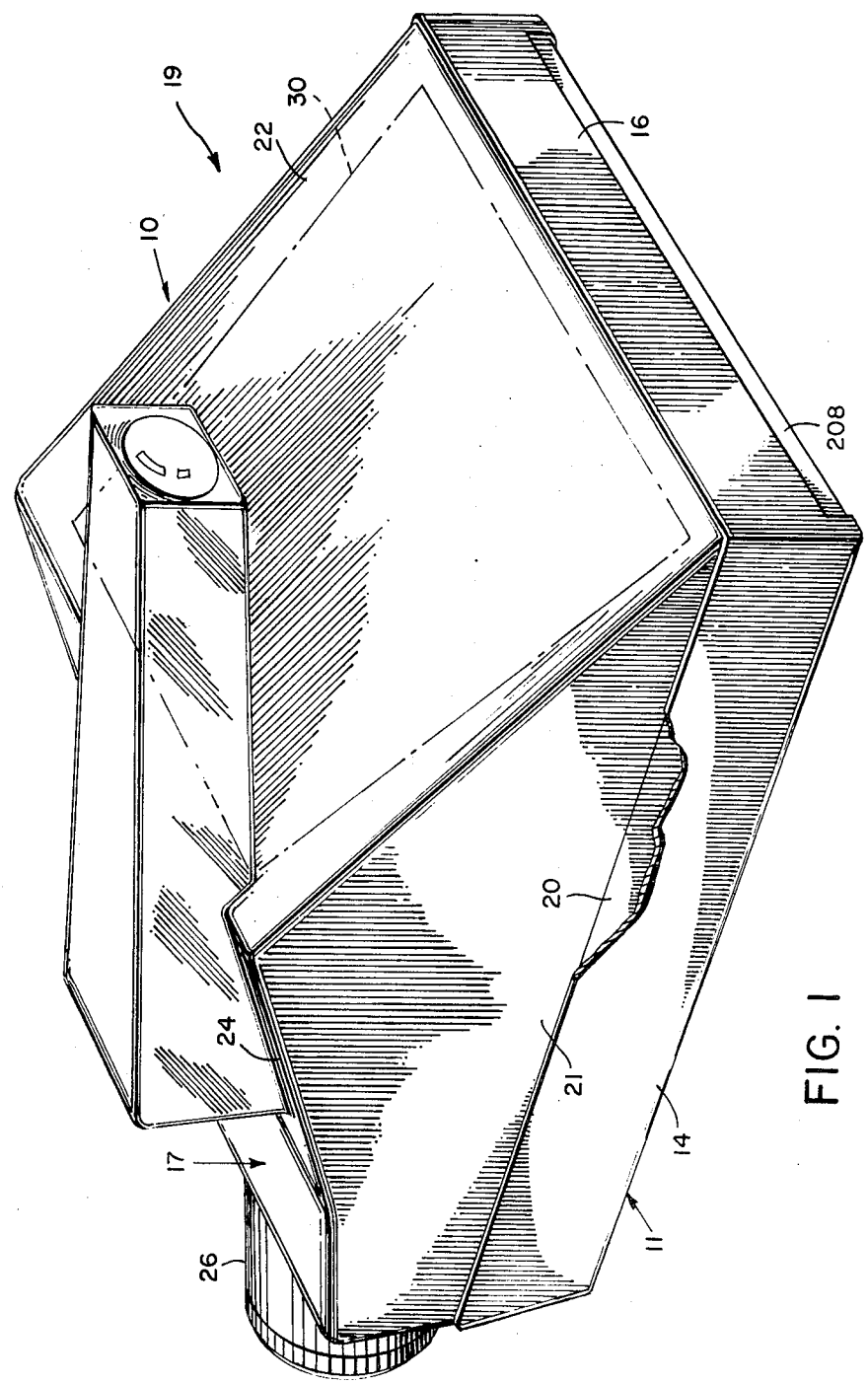
FIG. 1 is a perspective view of a self-developing camera embodying the invention.
Figure 2:
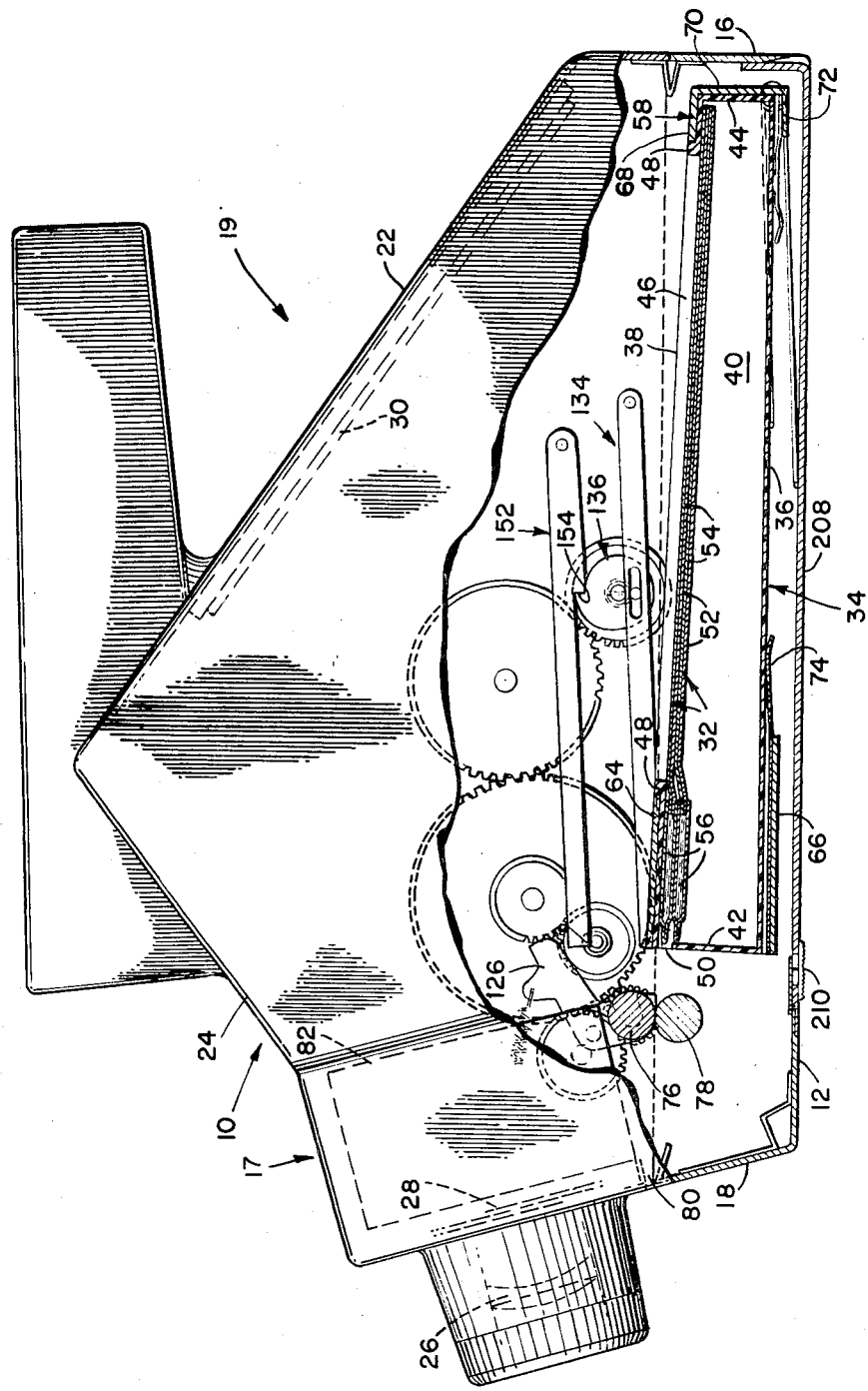
FIG. 2 is a partial sectional view of the camera of FIG. 1 shown loaded with a film pack.

Reference is now made to FIGS. 1 and 2 of the drawings wherein there is shown a self-developing camera embodying the invention. The camera, designated 10, is of the same basic type as shown in the aforementioned patent and application and comprises a housing having a rear section generally designated 11 including a rear wall 12, outer side walls 14 and an end wall 16; a forward section generally designated 17 including a forward wall 18 and enclosing a lens and shutter assembly; and a main section 19 mounting and joined with the forward and rear sections. Main housing section 19 includes side walls having rear portions 20 located inside and closely adjacent outer side walls 14 and forward portions 21 convergent to a trapezoidal shaped wall 22 and a connecting wall 24 extending from wall 22 to forward housing section 17. Rear housing section 11 is movable forwardly and rearwardly relative to the main and forward housing sections to provide an expansible chamber at the rear of the camera.

The camera includes an exposure system comprising a lens 26 mounted in forward housing section 17 and a shutter 28 preferably of the type which automatically controls the exposure parameters in accordance with the lighting conditions of the subject. The exposure system is designed to expose a photosensitive element positioned within the rear of the camera housing substantially in a plane intersecting the lens axis at an acute angle, and includes a mirror 30 mounted on the inside of wall 22 for reflecting light from lens 26 toward the photosensitive element located in position for exposure and for reversing the image formed by the lens on the photosensitive element.

Camera 10 is adapted for use with a photographic film pack of the type described and claimed in the copending U.S. application of Irving Erlichman, Ser. No. 766,548, filed Oct. 10, 1968. The film pack, as shown in FIG. 2 comprises a plurality of film units designated 32, arranged in stacked relation in a container 34 having a rear wall 36, forward wall 38, tapered side walls 40, a leading end wall 42, and a trailing end wall 44. Forward wall 38 is formed with a rectangular exposure aperture 46 surrounded by a lip 48, and leading end wall 42 is formed with an exit slot 50 through which the forwardmost film unit can be moved, leading edge foremost, from the container following exposure.

Each film unit 32 preferably comprise a photosensitive sheet 52 and a second or image-receiving sheet 54 secured in face-to-face relation therewith, and a rupturable container 56 of processing liquid located adjacent the leading edges of the sheets in position to dispense its liquid contents between the sheets in response to the application of compressive pressure to the container. The photosensitive sheet is preferably opaque to actinic light and the second sheet is transparent to permit image-forming exposure of the photosensitive sheet through the second sheet and viewing of an image formed between the sheets. The processing liquid is adapted to form a visible transfer image between the sheets when distributed in a thin layer therebetween and preferably contains white opacifying agent for forming a layer between the transfer image and the exposed photosensitive material providing a background for viewing the transfer image.

The photosensitive sheet of the forwardmost film unit 32 is located in position for exposure against the inner or rear surface of forward wall 38 of the film pack container 34, suitable resilient means (not shown) being provided within the film pack container for urging the stack of film units 32 toward the forward wall. The camera includes means for holding the film pack container so that the photosensitive sheet of the forwardmost film unit is supported in proper position for exposure to light transmitted by lens 26 and reflected from mirror 30. In the form shown in FIGS. 2 through 5, these means for supporting the film pack container comprise a chassis or frame 58 including spaced side members 60 and 62 coupled to one another at one end by forward wall member 64 and a rear wall member 66 and at their opposite ends by a forward wall member 68, an end wall member 70 and a rear wall member 72. The spacing between side member 60 and 62 is equal to the width of a film pack container while the spacing between the facing edges of forward wall member 64 and 68 is substantially equal to the spacing between the outer edges of the portions of lip 48 at the ends of exposure aperture 46 in the forward wall of a film pack container 34. Thus a film pack container engaged between side members 60 and 62 is supported with its forward wall 38 against the rear surfaces of forward wall members 64 and 68 and will be precisely positioned for exposure of the forwardmost film unit. A spring 74 is mounted on rear wall member 66 for urging the film pack container forwardly against the forward wall members of the chassis and is spaced from forward wall member 64 by a distance sufficient to permit the lip 48 near the thicker end of the film pack container to move between the forward and rear wall members into exposure position.

The camera is preferably electrically operated by a battery contained in the film pack container held in chassis 58 and includes resilient contacts 75 for making electrical connection with the terminals of the battery mounted on the rear wall of film pack container 34.

Processing of a film unit 32 following the exposure thereof is accomplished by moving the film unit, container 56 foremost, between a pair of juxtaposed processing applying members adapted to apply compressive pressure to the film unit commencing with the rupturable container 56 to eject the fluid contents of the container between the photosensitive and second sheets 52 and 54 and then spread the liquid toward the trailing end of the film unit to form a uniform thin layer between the sheets. In the form shown, the processing members comprise a pair of processing rollers 76 and 78 mounted in juxtaposition with their axes substantially in a common plane near forward wall member 64 in position to engage a film unit as the latter is advanced container 56 foremost from container 34 through exit slot 50. Roller 76 is mounted in a fixed position while roller 78 is mounted for limited movement in the plane of the axes of the rollers toward and away from roller 76 and is bias toward roller 76. Processing of an exposed film unit is accomplished by feeding the foremost film unit from exposure position into the bite of processing rollers 76 and 78 and rotating the processing rollers to advance the film unit therebetween from the camera through a passage 80 in forward wall 18. The camera includes an electric motor 82 coupled to rollers 76 and 78 through a transmission for rotating the rollers to advance a film unit from the camera through passage 80.

The camera includes means for feeding the foremost film unit, following exposure thereof, from film pack container 34 through exit slot 50 into the bite of rollers 76 and 78. In the form shown in FIGS. 3 through 5, these film feeding means include an elongated link 84 mounted for reciprocating motion on side member 60 and a resilient (cantilever spring) film engagement member 86 mounted on link 84. Film engagement member 86 includes a rearwardly extending engagement section 88 adapted to project through an opening 90 formed at the juncture of forward wall 38 and trailing end wall 44 of film pack container 34 into engagement with the trailing edge of the forwardmost film unit. In this way movement of link 84 toward the processing rollers is effective to cause engagement section 88 to engage the trailing edge of the forwardmost film unit and movement of the latter into the bite of the processing rollers.

The camera includes means for reciprocating link 84 and in the form shown, these means comprise a rotary cam 92, and a cam follower lever 94 pivotally mounted at one end and having an O-shaped medial portion 96 engaged around cam 92 and a free end section on which is mounted a stud 98 engaged for sliding motion in an open-ended channel 100 in the end portion of link 84. By virtue of this construction, rotation of cam 92 through 180° is effective to reciprocate link 84 from the initial position shown in FIG. 3 to the position shown in broken lines in the same figure and thereby move a film unit into the bite of processing rollers 76 and 78. Continued rotation of cam 92 rotates through 360° is effective to reposition the engagement section 88 of the film engagement member 86 in readiness for and advancing the next succeeding film unit into the bite of the processing rollers. Cam 92 is preferably driven by an energy storage device such as a conventional spring motor shown as including a shaft 102 coupled to cam 92 around which is coiled a spring 104 coupled to motor 82 through a suitable transmission adapted to overwind spring 104 sufficiently to insure rotation of cam 92 through 360°. A simple latch arrangement is provided for releasably retaining cam 92 against rotation and in a preferred form the latch, may be released manually by the operator immediately subsequent to exposure and preferably as part of the same operation, (e. by depressing a button) which releases the shutter to make an exposure and starts the motor to initiate an operating cycle in which the exposed film unit is processed and the shutter is reset to make a subsequent exposure.

At the beginning of a processing cycle, motor 82 is energized to commence the rotation of processing rollers 76 and 78 and cam 92 is released to rotate and thereby advance the leading edge of the container 56 of the forwardmost film unit into the bite of rotating processing rollers which continue the movement of the film unit substantially in the same plane from the camera housing through opening 80 in forward wall 18. As previously noted in this application, and in the aforementioned U.S. Pat. No. 3,447,437 and application Ser. No. 29,753 the processing liquid distributed between the transparent image-receiving sheet and the light-opaque, photosensitive sheet contains an opacifying agent and/or a desensitizing agent which permit the film unit to be advanced directly into the light almost immediately as the liquid is spread. This obviates the necessity for a light-tight processing chamber for enclosing the film unit until such time as processing has advanced to the extent that the photosensitive element is no longer light-sensitive, or exposure of the film unit to light will not adversely effect image formation. However advancement of the film unit directly from between the processing rollers and from the camera presents the problem of what to do with the film unit as it emerges from the camera.

In the preferred camera shown in the drawings, rollers 76 and 78 are driven by an electric motor 82 and the entire exposure and processing cycle is substantially automatic requiring only that the operator aim and focus the camera and initiate an exposure and processing cycle during which the camera is placed in readiness to perform a subsequent exposure and processing cycle. Thus, it is now possible to make exposures and process film units in very rapid succession as the repetition rate is limited only by the time required to expose a film unit, advance it between the processing rollers and reset the camera for a subsequent exposure, and all of these functions can be accomplished in a small fraction of a second, particularly if camera resetting and processing are performed simultaneously. While the ability to make a number of photographs in rapid succession is obviously an advantage over prior art cameras, the problem of handling film units emerging from the camera in rapid succession is presented. The present invention accomplishes its stated objects in providing a novel and improved solution to the problem of what to do with a single film unit as it emerges from the camera of a number of film units being advanced in rapid succession between a pair of processing rollers.

The camera structure of the invention provides alternative solutions to the aforementioned problems. The first of these is to arrest the movement from the camera of a single unit with the trailing edge portion of the film unit engaged between the pressure-applying members and the major portion of the film unit projecting from the camera. Thus, the film unit is in effect, attached to the camera preventing it from falling and giving the operator an opportunity to grasp the film unit and withdraw the remaining, trailing end portion from the camera. The alternative mode of operation of the camera, that is, the mode employed to expose and process a number of film units in rapid succession, is to reverse the direction of rotation of the processing rollers with the trailing edge portion of each film unit engaged therebetween and thereby return the film unit to a storage position within the camera. This latter operation requires only a small fraction of a second so that the cycling rate for the camera remains very fast and each exposure and processing cycle, including returning an exposed and processed film unit to a storage chamber within the camera, may require substantially less than a second to complete.

Figure 3:
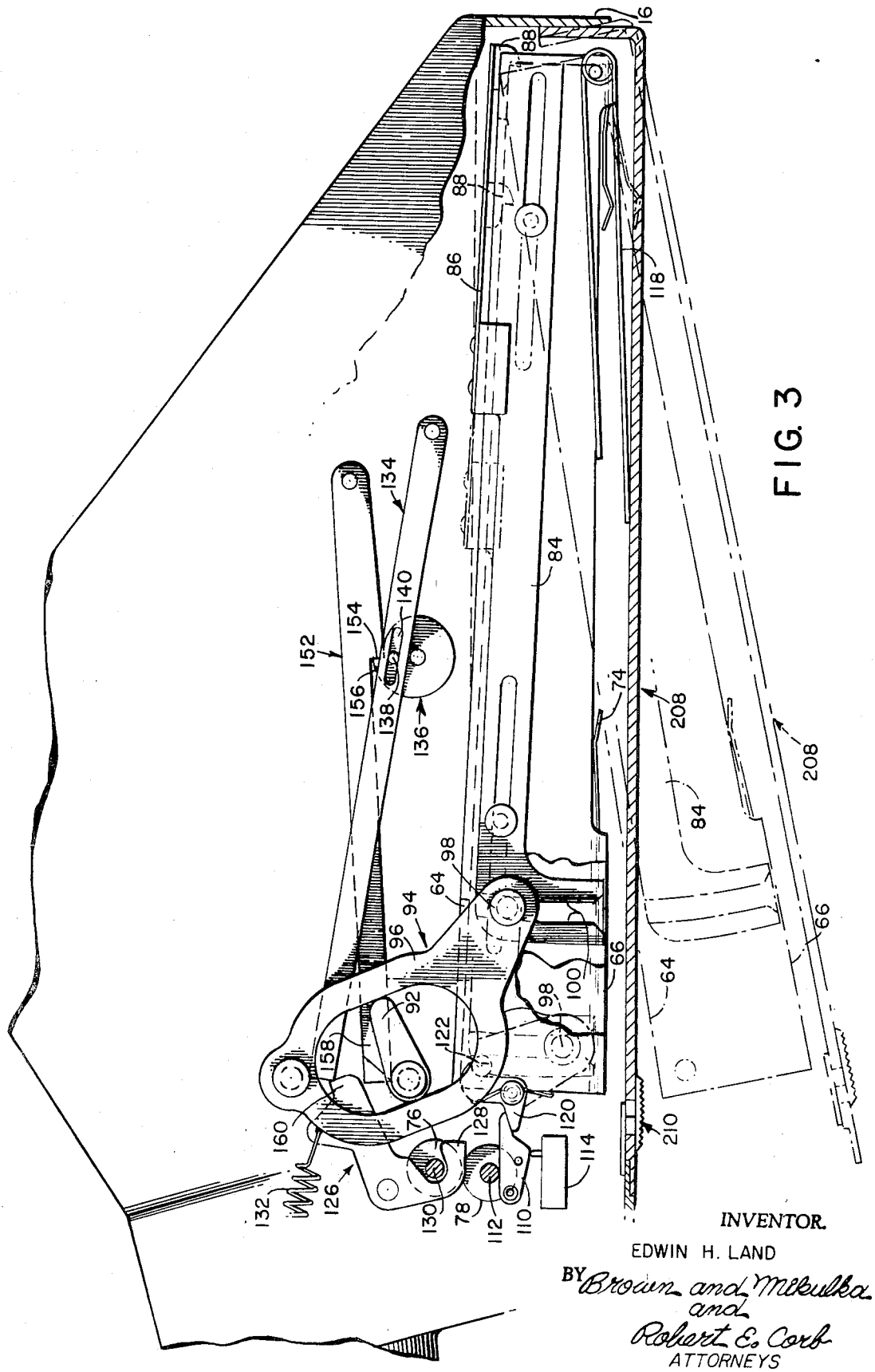
FIGS. 3 and 4 are fragmentary sectional views illustrating one embodiment of components of the camera in operative positions thereof.
Figure 4:
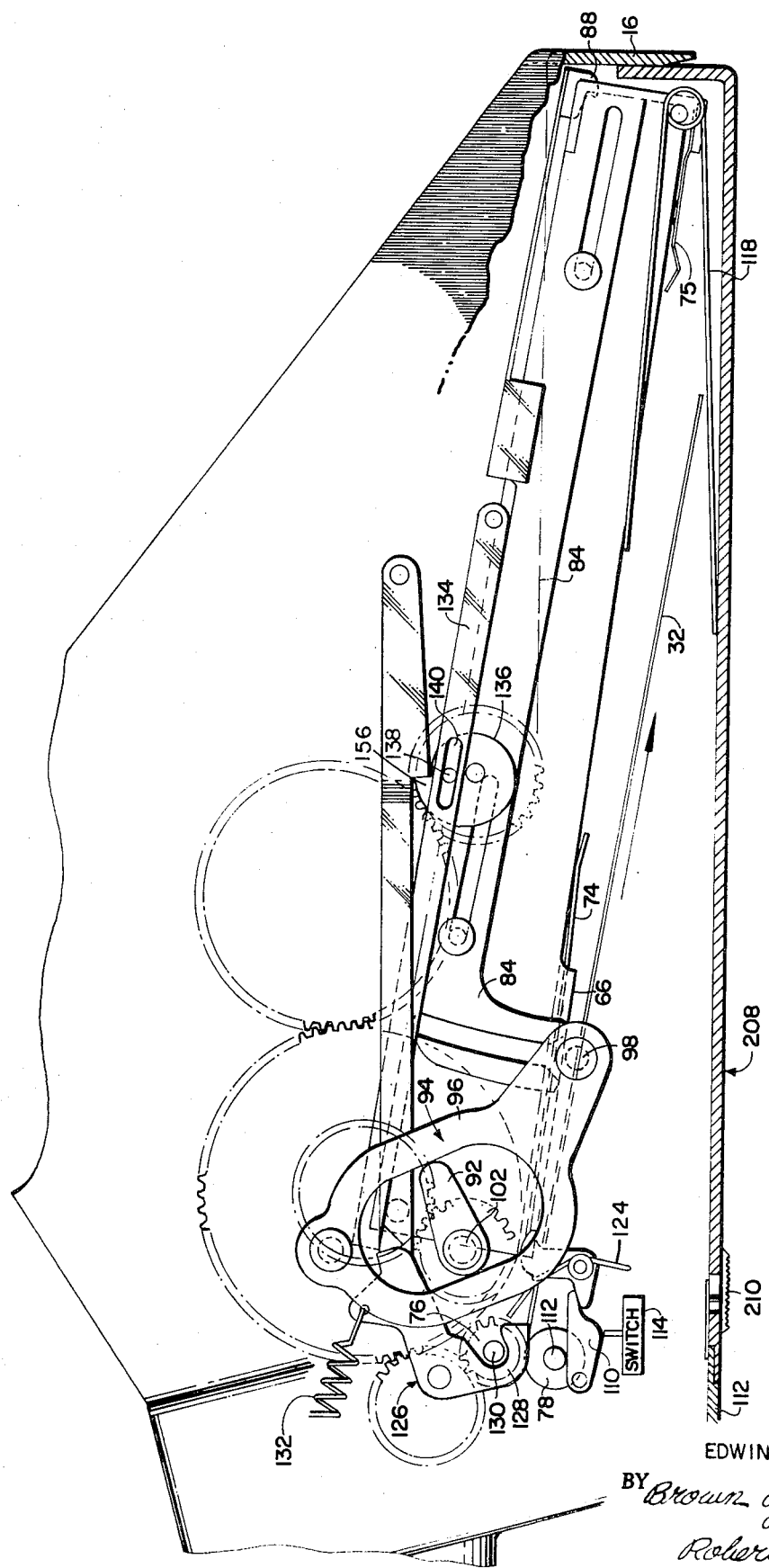
Figure 5:
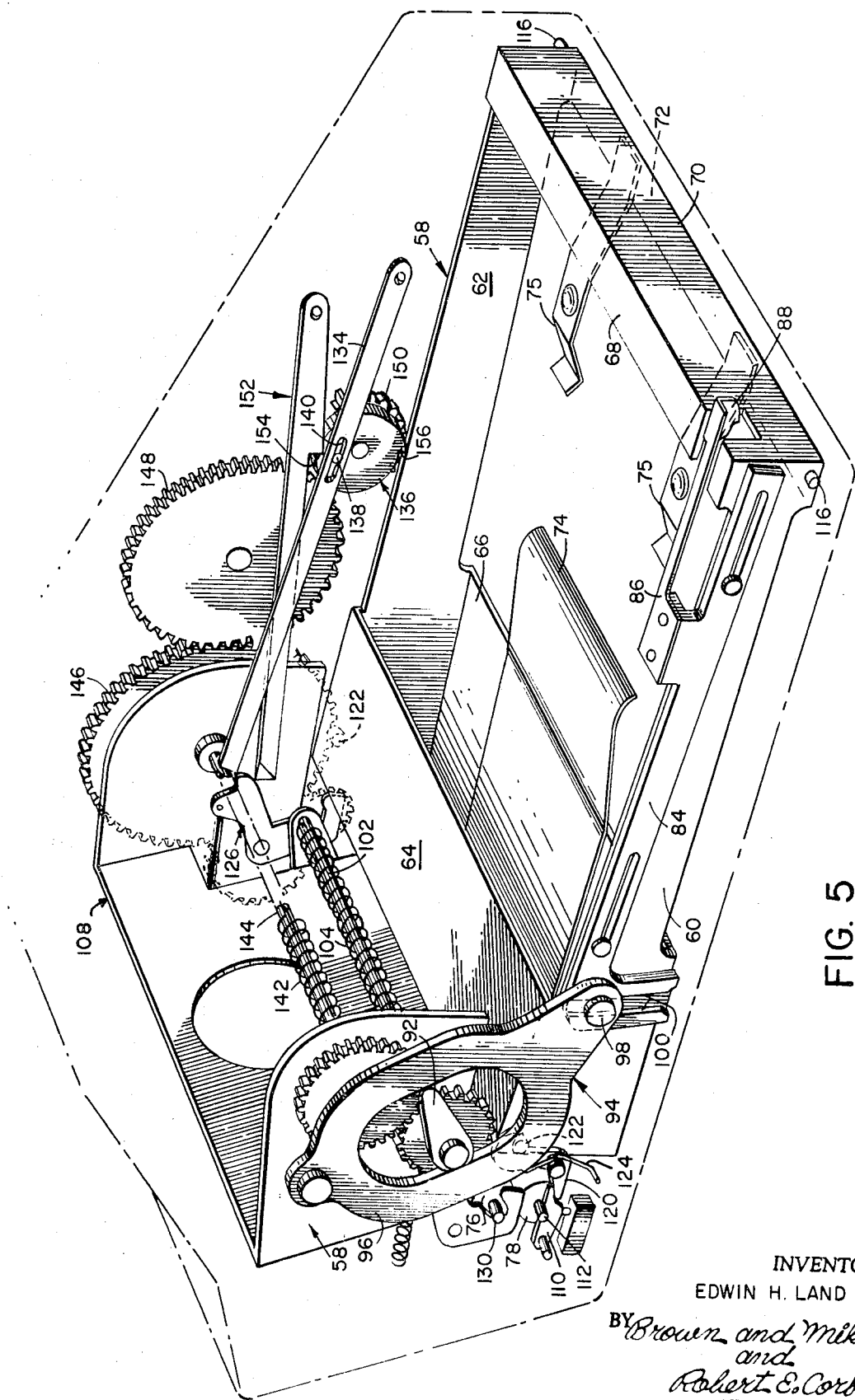
FIG. 5 is a fragmentary perspective view showing the camera components of 3 4 and 4.

In the form of camera shown in FIGS. 3 through 5, rotation of the processing rollers to advance a film unit from the camera is arrested by and in response to engagement of the trailing edge portion of the film unit between the processing rollers. This is accomplished by providing means responsive to increased separation of the processing rollers which occurs when the trailing edge portion of the film unit is engaged therebetween. It is the practice in self-developing film units of the type disclosed, for example, in the U. S. Pat. application of Richard J. Chen, Ser. No. 756,017, filed Aug. 28, 1968 and now U.S. Pat. No. 3,607,285, to provide a quantity of processing liquid slightly in excess of the amount required to process the film unit and to provide means at the trailing edge of the film unit for collecting and retaining excess processing liquid. These last-mentioned means usually take the form of spacing elements for separating the processing rollers to provide space within the film unit for collecting and retaining the excess liquid. The compressed (by the rollers) thickness of the film unit in the region of the spacing elements is greater than the compressed thickness of any other portion of the film unit so that the spacing between the pressure-applying members resulting from this additional thickness of the film unit may be employed to arrest and also reverse the direction of rotation of the processing rollers.

The camera comprises a fixed frame or chassis 108 for supporting operating components thereof including the processing rollers 76 and 78, cam 92, cam follower 94 and the spring motor for driving the cam. The aforementioned means, responsive to engagement of the trailing edge portion of a film unit between processing rollers 76 and 78 for arresting rotation of the processing rollers are also mounted on chassis 108 and include a lever 110 engaged with one of two shafts 112 extending from one of the ends of processing roller 78 and mounting the processing roller for rotation. A conventional switch 114 may be provided in the motor circuit for interrupting the flow of current to the motor and is mounted on the chassis in position to be engaged and actuated by shaft 112 when roller 78 is displaced rearwardly as the thickened, trailing edge portion of a film unit enters the bite of the rollers. Switch 114, in the mode of operation of the camera in which the operator withdraws the processed film unit completely from the camera prior to making a subsequent exposure, may also be employed to terminate the exposure, processing and shutter resetting cycle and prevent initiation of another cycle until the trailing edge portion of the film unit has been manually withdrawn from the camera.

In the mode of operation of the camera in which the film unit is retracted and moved into a storage position within the camera, switch 114 is utilized to reverse the polarity of the current to the motor and thereby reverse the direction of rotation of processing rollers 76 and 78 when the trailing edge portion of the film unit is engaged between the rollers.

The storage position of a processed film unit is within the camera housing to the rear of the film pack container and holder therefore, between the film pack container and rear wall 12. Thus, in order to retract a film unit between the processing rollers and move it into storage position as shown in FIG. 4, it is necessary to displace the film pack container out of the path of return movement of the film unit. Means for performing this function include a stud 116 on side member 60 of chassis 58 at the end of the chassis furthest from the processing rollers for mounting the chassis for pivotal movement forwardly from the exposure position shown in FIG. 3 to a displaced position shown in FIG. 4, in which the edge of rear wall member 66 closest the processing rollers, is located forwardly of the path of return movement of a film unit between processing rollers 76 and 78.

Means are provided for displacing frame 58 and the film pack container 34 held therein forwardly to their displaced position and comprise, for example, resilient means in the form of a torsion spring 118 adapted to pivot the chassis in a clockwise direction. The chassis is retained in exposure position against the bias of spring 118 by a latch member 120 pivotally mounted on chassis 108 and biased into latching engagement with a stud 122 on one of side members 60 and 62 of chassis 58 by a torsion spring 124. Latch member 120 is biased by spring 124 into engagement with lever 110 so that when the latter is pivoted in a clockwise direction in response to displacement of processing roller 78, the lever will coact with latch member 120 pivoting the latter in a counterclockwise direction from engagement with stud 122 freeing chassis 58 to pivot forwardly under the bias of spring 118 into its displaced position out of the path of return movement of a film unit. Spring 118 is designed to provide for the very rapid displacement of the film pack container; however, the invention also contemplates the provision of a slight delay between the stopping of rotation of the processing rollers and the commencement of rotation of the processing rollers in the opposite direction to allow time for the film pack container to be displaced out of the path of return movement of the film unit. Conventional switching means are available to perform this delay function.

In the operation of the camera, the processing rollers are rotated until the film unit has been moved from engagement between the rollers at which point the end of the film unit is no longer gripped between rollers but may still be located within the bite of the rollers such that rearward displacement of the leading end of the film unit could result in damage to the film unit when chassis 58 and the film pack container are displaced rearwardly into exposure position. Accordingly means are provided for moving the leading end of the film unit from the bite of the processing rolls to permit the rearward displacement of the film unit. These means include at least one and preferably two pushers 126 each pivotally mounted on frame 108 closely adjacent the ends of the processing rollers. Each pusher 126 includes a generally C-shaped arm 128 adapted to extend closely adjacent the ends of processing rollers between a shaft 112 and one of shafts 130 on which roller 76 is pivotally mounted. The length of the rollers is slightly less than the width of a film unit so that the ends of arms 128 will be engaged by the leading edge of a film unit pivoting the pushers in a clockwise direction as a film unit is moved from exposure position into the bite of processing rollers. Pushers 126 are biased by springs 132 in a counterclockwise direction so as to ride on the forward marginal surfaces of a film engaged between the rollers and engage and push the film unit inwardly beyond the bite of the processing rollers upon return movement of the film unit from engagement with the rollers.

Means are provided for returning chassis 58 and the film pack container held therein to exposure position following return movement of a film unit from the bite of the processing rollers. In the form shown in FIGS. 3 through 5, these means comprise an elongated cam follower lever 134 pivotally mounted at one end on the camera body and engaged rear its opposite end with stud 122 on chassis 58. A rotary cam 136 including a stud 138 engaged in a slot 140 in cam lever 134 is provided for pivoting the cam lever in a counterclockwise direction in engagement with stud 122 to displace chassis 58 rearwardly into exposure position. Cam 136 is preferably driven by a spring motor including a spring 142 coiled around a shaft 144 and coupled to cam 136 by a transmission including gears 146, 148, and 150. The spring 142 which drives cam 136 is adapted to be tensioned in the same manner as spring 104 and for this purpose, is coupled by a conventional transmission to electric motor 82. In the preferred form of camera, springs 104 and 142 are coupled to the motor in such a way that one of the springs, e. g. 142, is tensioned during outward movement of a film unit and the other spring, e. g. 104, is tensioned during return movement of the film unit thereby evening out the load on the motor.

Control means are provided for releasing cam 136 for rotation when a returning film unit has been moved from between the processing rollers and include an elongated latch lever 152 pivotally mounted near one end and including a shoulder 154 adapted to engage a shoulder 156 on cam 136 for preventing clockwise rotation of the cam under the bias of spring 142. The free-end section, designated 158, of latch lever 152 extends into the path of movement of an end section 160 of pusher 126. Latch lever 152 is biased (in a counterclockwise direction) into engagement with cam 136 and end section 158 of the latch lever is tapered to permit end section 160 of pusher 126 to deflect the free-end section of latch lever to one side of the path of movement of end section 160 when the pusher is pivoted in a clockwise direction in response to the outward movement of a film unit in engagement with the C-shaped arm 128 of the pusher between the processing rollers. By virtue of this construction and arrangement, as the pusher rotates in a counterclockwise direction moving the leading end of a film unit inwardly (to the right) from between the processing rollers, end section 160 of the pusher engages end section 158 of latch lever 152 pivoting the latter in a clockwise direction disengaging shoulder 154 from shoulder 156 on the cam to release the cam for rotation through 360°. Thus chassis 58 and the film pack container held therewithin will be returned to exposure position automatically immediately as the leading end of a film unit has been moved beyond the bite of the processing rollers. Open ended channel 100 in link 84 permits disengagement and reengagement of the link with stud 98 on cam follower 94.

In another embodiment of the camera shown in FIGS. 6 and 7, the control means for initiating movement of the film-holding chassis 58 are actuated by means located in the path of movement of a film unit and adapted to be engaged and actuated by a film unit. Another major difference in this latter embodiment is found in the means for moving the film-holding chassis which, in this case, is resiliently biased into exposure position and driven into a displaced position to permit return movement of a film unit. The other components of this embodiment of the camera may be substantially as shown and described.

The means for displacing chassis 58 forwardly from an exposure position include a rotary cam 162 for driving a stud 164 engaged in a slot 166 in the medial portion of an elongated cam follower lever 168 pivotally mounted at one end and engaged at its other end behind stud 122 on one of side members 60 and 62 of chassis 58. Cam 162 is driver in a counterclockwise direction by a spring motor such as previously described (in connection with cams 92 and 136) and is restrained against rotation by a spring biased latch 170 adapted to engage a shoulder 172 on the cam. Thus when cam 162 is released for rotation, cam follower lever 168 will be pivoted in a clockwise direction in engagement with stud 122 on chassis 58 moving the chassis forwardly out of the path of return movement of a film unit.

The control means responsive to engagement by a film unit for releasing cam 162 for rotation include a V-shaped film engagement lever 174 having arms 176 and 178 and mounted for pivoting and linear movement on a release member 180, in turn mounted for sliding movement between guide pins 182 substantially in the direction of movement of film units between processing rollers 76 and 78. Release member 180 includes a medial section 184 engaged for sliding movement between guide pins 182 and includes a slot 186 for pivotably and slidably receiving a stud 188 mounted on film engagement lever 174; a latch arm 190 extending generally at a right angle to medial section 184; and a release arm 192 extending from the opposite end of medial section 184 into engagement with latch 170. Release member 180 is biased in the direction of outward movement of a film unit, i. e. to the left viewing FIG. 6, by spring 194 attached to latch arm 190 and is movable linearly in the opposite direction to cause release arm 192 to engage and pivot latch 170 releasing cam 162 for rotation.

Film engagement lever 174, being mounted on release member 180, is also movable in the direction of movement of a film unit and is biased for counterclockwise rotation relative to release member 180 by a torsion spring 196 tending to pivot arm 176 rearwardly into the path of movement of a film unit between rollers 76 and 78. In the operation of the camera, a film unit, as i is advanced from film container 34 through exit slot 50 toward the bite of rollers 76 and 78, engages and pivots arm 176 of film engagement lever 174 forwardly in a clockwise direction. As the film unit moves between the rollers, arm 176 will continue to ride on the forward surface of the film unit until the trailing edge portion of the film unit is engaged between rolls 76 and 78. Arm 176 includes a curved rear edge section 198 for riding on the forward surface of the margin of a film unit and a notch 200 in the end of arm 176 for engaging the trailing edge of a film unit during return movement of the film unit so that the latter is effective to displace lever 174 in the direction of return movement of the film unit, i. e. to the right, pivoting latch 170 to release cam 162 for rotation. Rotation of processing rollers 76 and 78 may be arrested with the trailing edge portion of a film unit engaged between the rollers in response to the spacing apart of the rollers utilizing a lever 110 and switch 114 such as previously described, or by providing a switch (not shown) adapted to be actuated in response to the counterclockwise rotation of lever 174 which occurs when the trailing edge of a film unit has been advanced between the processing rollers beyond curved edge section 198.

As the film unit is being retracted, i. e. moved to the right, cam 162 is released for rotation driving follower lever 168 and stud 122 forwardly to the displaced position shown in broken lines in FIG. 6. The free end of arm 178 is designed to function as a cam follower adapted to engage a forwardly inclined, fixed cam surface 202 tending to displace stud 188 rearwardly during movement of lever 174 to the right, until the free end of arm 178 becomes engaged in a recess 204 and movement of lever 174 to the right (the direction of return movement of the film) is arrested. At this point, the trailing edge of a returning film unit becomes disengaged from notch 200 in arm 176 passing behind the arm in engagement with curved edge section 198 preventing counterclockwise rotation of lever 174 so that the end of arm 178 is prevented from pivoting out of engagement in recess 204 and in this manner, release member 180 is prevented from moving to the left under the bias of spring 194 as long as a portion of a film unit is engaged between the processing rollers.

As release member 180 is moved to the right by a returning film unit, latch arm 190 is displaced to a position in alignment with stud 122 and functions to engage the stud in the forwardly displaced position of chassis 58 and retain the chassis in its forwardly displaced position as long as a film unit engaged between the processing rollers prevents the counterclockwise rotation of engagement lever 174. When a film unit has been moved (returned) beyond the bite of rollers 76 and 78, as when propelled by pusher 126, lever 174 is then free to pivot counterclockwise disengaging arm 178 from recess 204 permitting lever 174 and release member 180 to move to the left thereby disengaging latch arm 190 from stud 122 on chassis 58. This permits the chassis to return to exposure position under the bias of spring (not shown) similar, for example, to spring 118 but acting in the opposite direction.

The camera of the invention is structured to permit loading of a film pack container into chassis 58 and to permit withdrawal of an exposed and processed film unit from a storage position behind the film pack container between the latter and rear wall 12. In the form shown, this structure includes a door 208 in rear wall 12 having a width equal to the width of chassis 58 and the components mounted on the sides thereof, preferably mounted for pivotal motion about an axis that is the same as the pivotal axis of chassis 58 or is closely adjacent thereto. Door 208 is pivotable from a closed position wherein it is retained by a latch 210, to an open position shown in broken lines in FIG. 3. The door is dimensioned to permit chassis 58 to be pivoted rearwardly from exposure position to a position outside of the camera housing shown in broken lines in FIG. 3, to the rear of rear wall 12 at which a film pack container may be introduced between forward wall member 64 and rear wall member 66. The open-ended slot 100 in link 84 permits the link, which is mounted on chassis 58, to be moved rearwardly with the chassis from engagement with stud 98 and to be returned to engagement with the stud after loading of a film pack into the chassis and return of the latter to exposure position.

In the embodiment of the camera shown in FIGS. 6 and 7 in which the film pack holding chassis 58 is biased rearwardly by a spring and driven forwardly into a displaced position by engagement of cam follower lever 168 with stud 122 on the chassis, means in the form of a rotary cam 212 are provided for displacing (by bending) lever 168 out of the path of rearward movement of stud 122 to permit rearward movement of the chassis from its exposure position into its leading position.

It will be noted from the foregoing that the invention provides an automatic self-developing camera adapted to be employed to produce photographic prints singly at substantial intervals or in very rapid succession. The prints as they are produced emerge from the camera and may be withdrawn and examined immediately or they may be returned to a storage position within the camera automatically and removed when desired.

Since certain changes may be made in the above apparatus without departing from the scope of the invention herein involved, it is intended that all matters contained in the above description or shown in the accompanying drawings shell be interpreted as illustrative and not in a limiting sense.

What is claimed is:

1. In photographic apparatus including a pair of juxtaposed pressure-applying members movable to advance a photographic film unit between said members part way from said apparatus while distributing a liquid processing agent within the film unit, the improvement comprising, in combination:
    control means for arresting the motion of said pressure-applying members with the trailing end of the film unit engaged between said members and the major portion of said film unit extending from said apparatus, said control means including means responsive to separation of said pressure-applying members for sensing the engagement of the trailing end section of a film unit between said pressure-applying members to arrest the motion thereof.

2. Photographic apparatus as defined in claim 1 wherein said control means include means for reversing the direction of motion of said pressure-applying members to retract the film unit into said apparatus and advance said film unit into a storage position therein.

3. Photographic apparatus as defined in claim 2 including electric motor for driving said pressure-applying members to advance a film unit therebetween and wherein said control means include means for reversing the polarity of the current energizing said motor.

4. Photographic apparatus as defined in claim 2 including holding means for supporting a photographic film unit in position for exposure and guide means for guiding a film unit into a storage position behind said exposure position during retraction of said film unit into said apparatus.

5. Photographic apparatus as defined in claim 4 wherein said holding means include means for supporting a container of stacked photographic film units with the forward-most film unit located in position for exposure and said guide means are adapted to guide a film unit into a storage position behind said container.

6. Photographic apparatus as defined in claim 4 including means at the rear thereof providing access to the interior of said apparatus to permit removal of a film unit located in storage position therein.

7. Photographic apparatus as defined in claim 4 including first displacement means for moving said holding means forwardly from exposure position to permit the return movement of a film unit in a storage position behind said holding means during retraction of said film unit.

8. Photographic apparatus as defined in claim 7 wherein said pressure-applying members include a pair of juxtaposed rollers rotatable in engagement with a film unit to advance said film unit between said rollers and said control means include means for initiating the forward displacement of said holding means and reversing the direction of rotation of said rollers to advance a film unit, engaged between said rollers, into a storage position behind said holding means.

9. Photographic apparatus as defined in claim 7 further including means for returning said holding means to said exposure position following return movement of a film unit into storage position.

10. Photographic apparatus as defined in claim 7 wherein said first displacement means include first resilient means biasing said holding means forwardly and said control means include means for releasing said holding means for movement under the bias of said resilient means.

11. Photographic apparatus as defined in claim 10 further including second displacement means for returning said holding means to said exposure position against the bias of said first resilient means.

12. Photographic apparatus as defined in claim 11 wherein said control means include means responsive to movement of a film unit from engagement with said pressure-applying members for actuating said second displacement means to return said holding means to said exposure position.

13. Photographic apparatus as defined in claim 11 wherein said second displacement means include a second spring for acting against said resilient means to return said holding means to said exposure position.

14. Photographic apparatus as defined in claim 13 further including drive means for moving said pressure-applying members to move a film unit engaged therebetween and means for tensioning said spring during movement of a film unit by said pressure-applying members.

15. Photographic apparatus as defined in claim 4 further including means mounted on said holding means for advancing an exposed film unit from exposure position into engagement with said pressure-applying members.

16. Photographic apparatus as defined in claim 2 wherein said pressure-applying members include a pair of juxtaposed rollers rotatable in engagement with a film unit to move said film unit between said rollers, said apparatus further including impeller means for engaging and moving the end section of a film unit toward storage position away from the bite of said rollers following movement of the film unit by the rollers from engagement therebetween.

17. Photographic apparatus as defined in claim 16 wherein said impeller means include a movable film-engaging member extending into the path of movement of a film unit between said pressure-applying members and means for biasing said film-engaging member in a direction opposite to the direction of movement of a film unit from said apparatus.

18. Photographic apparatus as defined in claim 17 further including holding means for supporting a photographic film unit in position for exposure and first displacement means for moving said holding means forwardly from exposure position to permit the return movement of a film unit into storage position behind said holding means during retraction of a film unit.

19. Photographic apparatus as defined in claim 18 wherein said first displacement means include a first spring for driving said first displacement means to move said holding means forwardly from exposure position.

20. Photographic apparatus as defined in claim 19 further including second displacement means for retuning said holding means to said exposure position.

21. Photographic apparatus as defined in claim 20 wherein said second displacement means includes a second spring for driving said second displacement means and said apparatus further includes drive means for operating said pressure-applying members to move film unit therebetween and tensioning one of said springs during movement of a film unit between said pressure-applying members.

22. Photographic apparatus as defined in claim 21 wherein said impeller means include means responsive to movement of said film-engaging member in the direction of return movement of a film unit for initiating the operation of said second displacement means upon movement of a film unit by said impeller means from engagement with said pressure-applying members.

* * * * *